(12) United States Patent
Shuster (10) Patent No.: US 10,928,973 B2
(45) Date of Patent: Feb. 23, 2021

(54) COMPUTER SIMULATION METHOD WITH USER-DEFINED TRANSPORTATION AND LAYOUT

(71) Applicant: PFAQUTRUMA RESEARCH LLC, Wilmington, DE (US)

(72) Inventor: Brian Mark Shuster, Vancouver (CA)

(73) Assignee: PFAQUTRUMA RESEARCH LLC, Wilmington, DE (US)

( * ) Notice: Subject to any disclaimer, the term of this patent is extended or adjusted under 35 U.S.C. 154(b) by 316 days.

(21) Appl. No.: 15/144,623

(22) Filed: May 2, 2016

(65) Prior Publication Data

US 2016/0246474 A1 Aug. 25, 2016

Related U.S. Application Data

(63) Continuation of application No. 11/867,345, filed on Oct. 4, 2007, now Pat. No. 9,329,743.
(Continued)

(51) Int. Cl.
*G06F 3/0481* (2013.01)
*A63F 13/79* (2014.01)
(Continued)

(52) U.S. Cl.
CPC .......... *G06F 3/04815* (2013.01); *A63F 13/12* (2013.01); *A63F 13/40* (2014.09); *A63F 13/63* (2014.09); *A63F 13/79* (2014.09); *G06F 3/048* (2013.01); *G06F 3/0486* (2013.01); *G06F 3/04842* (2013.01); *G06T 19/003* (2013.01); *G06T 19/20* (2013.01);
(Continued)

(58) Field of Classification Search
CPC .................. A63F 13/06; A63F 2300/64; A63F 2300/6661; A63F 13/52; A63F 2300/69; A63F 13/525; A63F 2300/6684; A63F 2300/8082; A63F 13/12; A63F 2300/5553; G06F 3/04815; G06F 3/011; G06F 16/9537; G06F 3/0346; G06T 19/006; G06T 13/40; G06T 11/00; G06T 17/00; G06T 13/80; G06T 15/00; G06T 19/20; G06T 13/20
See application file for complete search history.

(56) References Cited

U.S. PATENT DOCUMENTS

| | | | | |
|---|---|---|---|---|
| 5,764,232 A * | 6/1998 | Oouchi | ............. | A63F 13/10 345/419 |
| 5,923,330 A * | 7/1999 | Tarlton | ............. | G06F 17/30572 345/419 |
| 2002/0113809 A1 * | 8/2002 | Akazawa | ............. | G06F 3/04815 715/706 |
| 2004/0229687 A1 * | 11/2004 | Miyamoto | ............. | A63F 13/10 463/30 |

(Continued)

OTHER PUBLICATIONS

Chastine et al., A Framework for Inter-referential Awareness in Collaborative Environments; 2006; IEEE; 5 pages.*

*Primary Examiner* — Linh K Pham
(74) *Attorney, Agent, or Firm* — Fernando & Partners, LLP (57) ABSTRACT

A multi-user process receives input from multiple remote clients to manipulate avatars through a virtual environment modeled in a host memory. The environment includes portal objects operable to transport avatars, which are modeled objects operated in response to client input, between defined areas of the virtual environment. The portals are customizable in response to client input to transport avatars to destinations preferred by users. Adjacent defined areas are not confined in extent by shared boundaries. The host provides model data for display of the modeled environment to participating clients.

20 Claims, 5 Drawing Sheets

Related U.S. Application Data (60) Provisional application No. 60/828,216, filed on Oct. 4, 2006.

(51) Int. Cl.

| | | |
|---|---|---|
| *A63F 13/63* | (2014.01) | |
| *A63F 13/30* | (2014.01) | |
| *G06F 3/048* | (2013.01) | |
| *A63F 13/40* | (2014.01) | |
| *G06F 3/0484* | (2013.01) | |
| *G06F 3/0486* | (2013.01) | |
| *G06T 19/00* | (2011.01) | |
| *G06T 19/20* | (2011.01) | |
| *A63F 13/5378* | (2014.01) | |
| *G06F 16/954* | (2019.01) | |

(52) U.S. Cl.
CPC ... *A63F 13/5378* (2014.09); *A63F 2300/5553* (2013.01); *A63F 2300/8082* (2013.01); *G06F 16/954* (2019.01); *G06T 2219/024* (2013.01); *G06T 2219/2016* (2013.01)

(56) References Cited

U.S. PATENT DOCUMENTS

| | | | | |
|---|---|---|---|---|
| 2005/0005247 | A1* | 1/2005 | Kamachi | G06F 3/011 715/804 |
| 2006/0114171 | A1* | 6/2006 | Vascotto | G09B 9/00 345/1.1 |
| 2007/0109296 | A1* | 5/2007 | Sakagawa | G06T 19/00 345/419 |
| 2007/0257914 | A1* | 11/2007 | Komatsumoto | G06T 13/20 345/427 |
| 2007/0291034 | A1* | 12/2007 | Dones | G09B 29/106 345/427 |
| 2007/0291035 | A1* | 12/2007 | Vesely | G09B 9/00 345/427 |
| 2008/0100704 | A1* | 5/2008 | Venetianer | G06K 9/00771 348/143 |
| 2008/0215994 | A1* | 9/2008 | Harrison | A63F 13/10 715/757 |
| 2008/0263460 | A1* | 10/2008 | Altberg | G06Q 30/02 715/757 |
| 2009/0131167 | A1* | 5/2009 | Kawabata | A63F 13/5255 463/32 |
| 2016/0164769 | A1* | 6/2016 | Haggar | G06N 3/006 709/224 |

\* cited by examiner

COMPUTER SIMULATION METHOD WITH USER-DEFINED TRANSPORTATION AND LAYOUT

CROSS-REFERENCE TO RELATED APPLICATION

This application is a continuation of U.S. application Ser. No. 11/867,345, filed Oct. 4, 2007, now U.S. Pat. No. 9,329,743, which claims priority pursuant to 35 U.S.C. § 119(e) to U.S. provisional application Ser. No. 60/828,216, filed Oct. 4, 2006, which applications are incorporated by reference herein.

BACKGROUND

1. Field

The present disclosure relates to a computer simulated "virtual reality" universe in which human beings are able to interact with automated entities and other human beings in a modeled environment served to multiple clients via a networked system, and more particularly to systems and methods for enabling user-defined transportation and layout in a three dimensional virtual reality universe.

2. Description of Related Art

Various simulation games are known in which a 3-D physical world (actual or fantasy) is simulated. Games of this type are sometimes referred to as "virtual reality" or "virtual reality universe" (VRU) games. In known VRU games, an actual or fantasy universe is simulated within a computer memory. Multiple players may participate in a in the game through a computer network, such as a local area network or a wide area network. Each player selects an "avatar," often a three-dimensional figure of a man, woman, or other being, to represent them in the VRU environment. Players send inputs to a VRU engine to move their avatars around the VRU environment, and are able to cause interaction between their avatars and objects in the VRU. For example, a player's avatar may interact with an automated entity or person, simulated static objects, or avatars operated by other participants.

The VRU may take the form of at least one area or environment which is a virtual-reality three-dimensional map existing in a computer memory, consisting of elements that may include but are not limited to representations of rooms, outdoor areas, exotic environments, objects, people, animals, robots, avatars, robot avatars, time elements, additional spatial elements, and activities. Users establish a presence in the VRU by creating or using an avatar, which is a three-dimensional representative of the user in the VRU, and which can be navigated by the user around various environments in the VRU. A view or views of the VRU are displayed to the user using a computer display and user interface software as known in the art. Each user provides input to a computer controlling the VRU using an input device connected to a local node or client, which is in turn connected to the networked computer system. The VRU is shared by multiple participants, using elements from the common memory.

A VRU may be used for game play, on-line commerce, social introductions and networking, advertising, entertainment, or almost any other function that can be performed over a computer network. A VRU is defined not by the functions it performs, but by the appearance and operation of the environment in which multiple participants interact. This environment should simulate a three-dimensional spatial environment with interactive objects and other participants. A VRU may be described as an interactive, real-time three-dimensional animation with multiple participants.

The computer system is used to control the action of the avatars in response to user input. For example, avatars may be limited to simply observing the environment or area. But usually, avatars can interact with some or all of: other avatars, objects, the environment (e.g., walls, floors, roads, lakes, etc.), and automated or robotic avatars within at least one environment. Interactions by one avatar with any other avatar, object, the environment or automated or robotic avatars may, in some cases, but need not, result in outcomes that may effect or otherwise be observed or experienced by other avatars, objects, the environment, and automated or robotic avatars within the environment of the VRU.

Activities such as navigating web sites by visiting a web site and subsequently clicking a hyperlink to visit a different web site should be distinguished from navigation within a VRU. The navigation within a VRU is currently based on the methods used in the real world—namely, walking or running or otherwise maneuvering one's avatar physically from one area or environment to another area or environment, or in the alternative, entering some sort of portal or gateway or other transportation point (or by clicking on a link) to be teleported from one environment or area to another environment or area. The transportation portal may look like a door, a passageway, a wormhole or any of innumerable appearances, but with the effect that the maneuvering of one's avatar into the portal, or otherwise actuating the portal as by clicking or through some other mechanism, will transport one's avatar to a different environment or area.

One drawback of prior-art VRU's is that the environment or area may not be laid out by the designer such that moving one's avatar from one environment or area to another is most efficient for the user. For example, there may be several environments or areas that separate the user's avatar from his intended destination, which environments or areas the user does not wish or need to navigate past. Such physical navigation may be very time-consuming. Another drawback of the VRU is that teleportation from one environment or area to another which the user desires to visit may not be available, or, if available, may be inconveniently located for the user's avatar, such that, once again, the user is burdened with a time-consuming navigation to obtain the desired teleportation option. Therefore, notwithstanding the advantages of existing VRU environments, it is desirable to provide new VRU environments that overcome these and other limitations of the prior art.

SUMMARY

A system, method and apparatus are disclosed for allowing users of a VRU to create new and/or define or redefine existing transportation mechanisms to better suit their personal needs. The technology disclosed herein similarly allows operators of areas and environments within a VRU to customize, define or redefine the destination of such new or existing transportation mechanisms to better suit their needs, and the needs of the users. Accordingly, users are provided with the ability to experience networked activities in a manner that is different from the current internet or the World Wide Web and from prior-art VRU's.

The present technology uses the advantage that a VRU may be designed so that it is not confined to the same three dimensional space limitations as is the physical world.

Therefore, it is possible for users and operators of a VRU to allow doorways and other portals to send users to destinations that can be defined in some manner and are not permanently set to a single destination. Each user may be provided with the option to customize operation of a doorway or other portal. User-defined specifications for operation of a portal are stored in a database in association with a user ID. For example, VRU coordinates for destinations on either side of a portal may be stored in the database. When the user's avatar approaches the portal, the VRU engine queries the database with the user ID to obtain the coordinates of the destination location. When the avatar enters the portal, the engine serves the VRU environment existing at the defined location.

A customized element, or a common element, may be defined so as to occupy more space than is physically possible. For example, a building may have a 1000 square feet footprint when viewed from the outside, and a 10,000 square feet footprint (or any other size footprint) when viewed from the inside. For further example, a hallway may be provided with doors, each leading to a space or room of any desired size.

The present technology should be distinguished from applications which permit a game player or game developer to define a virtual environment for a game. Such applications do not permit participants in a common VRU or game to experience common areas or experiences while also defining the environment in a way that is customized for each user. The blending of common and custom elements in a multi-user VRU is a novel concept and requires the solution of problems that have not heretofore been attempted for successful implementation.

A more complete understanding of the simulation method with user-defined transportation will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION

The disclosed solution to enhance VRU's is a system, apparatus and method for allowing users dynamically to create user-defined doorways and other portals. In the detailed description that follows, like element numerals are used to denote like elements appearing in one or more of the figures.

Figure 1:
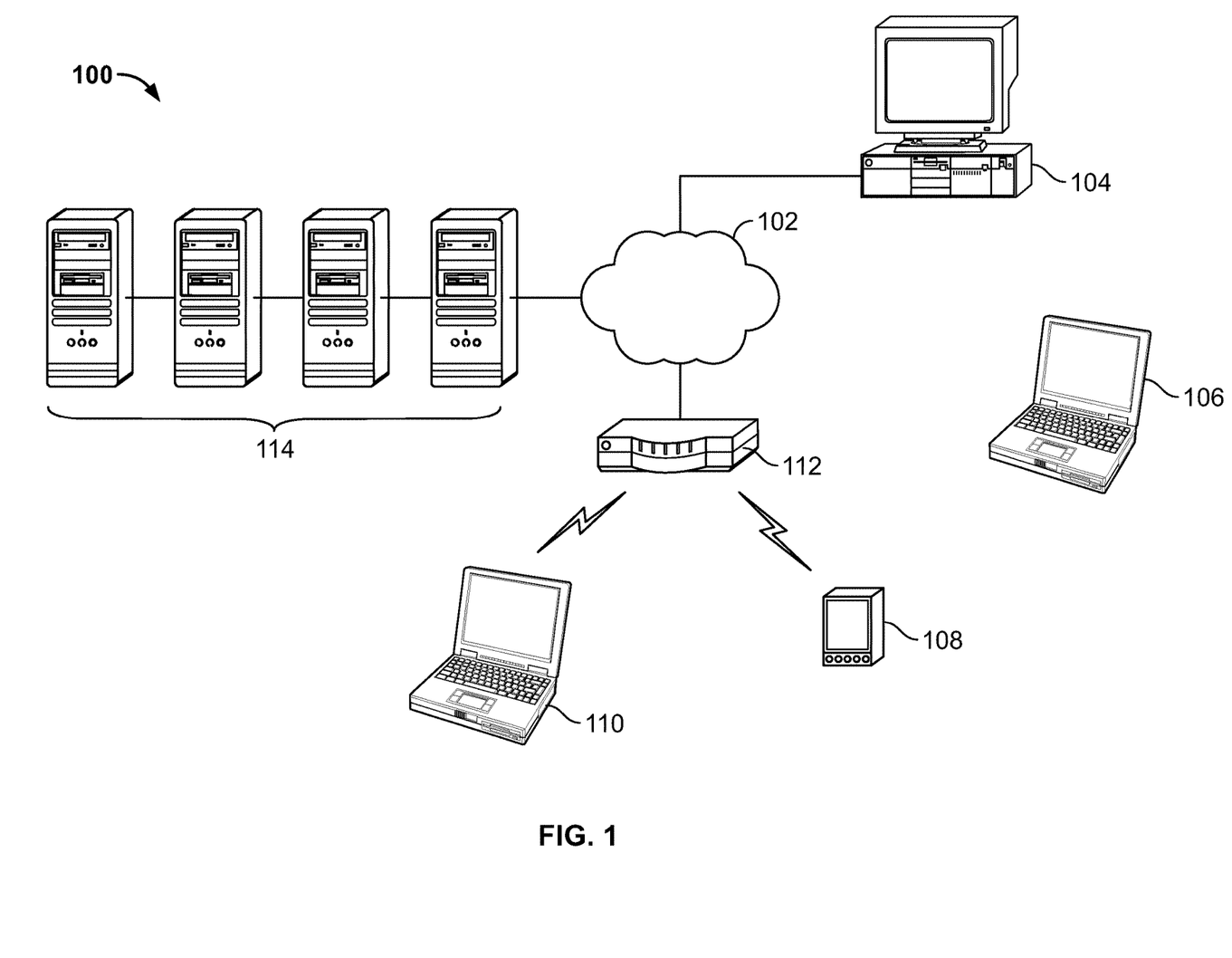
FIG. 1 is a schematic diagram showing a system for simulation method with user-defined transportation.

Referring to FIG. 1, a system 100 for providing a VRU to multiple users may comprise a plurality of client sites, nodes or terminals, for example a personal computer 104, portable computers 106, 110, a compact player, cell phone or digital assistant 108, and/or router 112 communicating via a WAN 102 to one or more servers 114. Servers 114 store and serve game data and software to the client sites. Software or firmware may also be located at each client site, configured to work cooperatively with software or firmware operating on servers 114. Generally, any number of users may be communicating with servers 114 for participation in the VRU at any given time.

Figure 2:
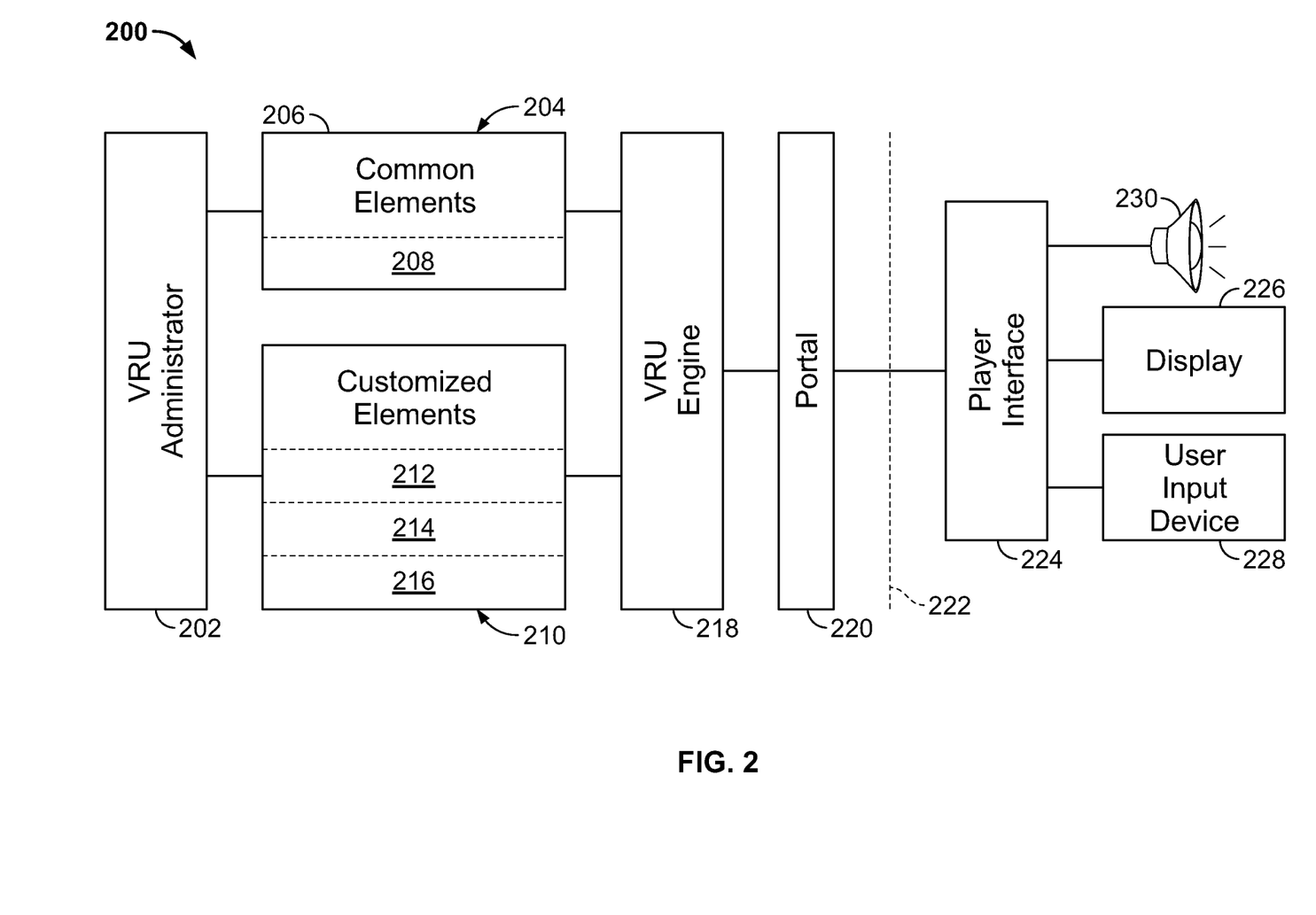
FIG. 2 is a schematic diagram showing a second system for simulation method with user-defined transportation.

Referring to FIG. 2, a system 200 for providing a VRU may be considered to be comprised of server-side components (to the left of dashed line 222) and client-side components (to the right of dashed line 222). Server-side components may comprise a portal 220 for managing connections to multiple simultaneous players. Portal 220 interacts with a VRU engine 218, passing user input from multiple clients to a game engine, and passing game data from the VRU engine to respective individual players. VRU engine 218 is operatively associated with two memory spaces, a common memory space 204 holding common elements of the VRU, and a personalized space 210. As known in the art, objects in a VRU are modeled as three-dimensional objects, or two-dimensional objects, having a defined location, orientation, surface, surface texture, and other properties for graphic rendering or game behavior. Common memory space 204 may be considered as comprised of a core area 206 for holding core common elements, and a non-core area 208 for holding non-core common elements 208. Customized space 210 may be comprised of various different customized areas 212, 214, 216, each assigned to a different user.

A portal or other transportation may be made up of a combination of personalizable and common elements. For example, the appearance of a door may be a common element that is the same, regardless of the destination to which it leads. The transport characteristics of the door, in comparison, may be personal to a user or a group of users. The door may lead to a first environment "A" by default, but may be customized to lead to any other environment, e.g., environment "B" for a particular user or users. Similarly, a road or path may be made to have a different destination, depending on who is traversing it. Therefore, in determining the result of a player passing through a portal or other transportation element, VRU engine 218 will draw from both common element space 206 and customized space 210.

A separate administration module 202 may operate at the server level to create, update, modify or otherwise control the content of the VRU as defined in the memory areas 204 and 210. Generally, changes in the personal space area 210 are driven by individual users, either through the VRU administrator 202 or another module. Control of common areas, i.e., the game environment and the objects in it, may be via the administrator module 202.

At the client level, a player interface module 224 may be installed to receive player inputs from one or more user input devices, such as a keyboard, mouse or other pointer, or microphone, and provide data to the VRU engine 218 via portal 222 in response to the input. The player interface module may also receive game data from portal 220 and process the data for display on display 226 and/or for audio output on speaker 230. Various systems and methods for providing a three-dimensional, multiplayer interactive animation to multiple players are known in the art, or may be adapted by one of ordinary skill for use with the technology disclosed herein. The technology is not limited to a particular hardware or software architecture for carrying out the steps described herein.

Figure 3A:
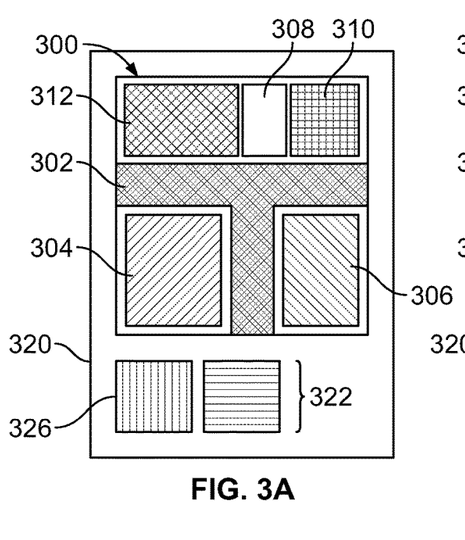
FIGS. 3A-3B are schematic plan views showing exemplary customization of portals in a common environment.
Figure 3B:
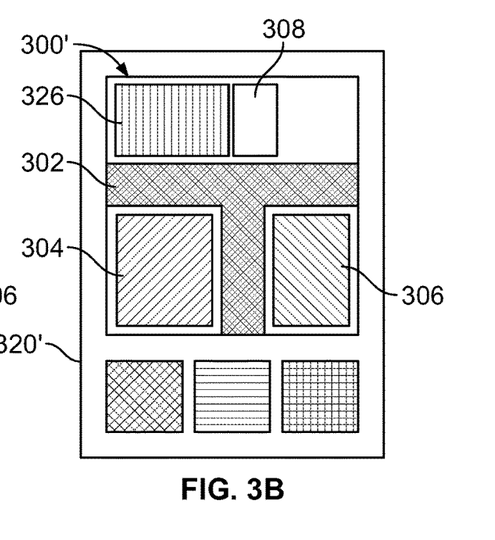

As disclosed herein, a user may be provided with the ability to define or redefine the destination of existing transportation mechanisms within an environment or area. FIGS. 3A and 3B show exemplary 3-D environments 300, 300' in plan view. Both environments share common elements, such as a road 302 and buildings 304, 306, 308. Each of these buildings may have an external appearance to clients represented by avatars on road 302, and one or more doors leading to the road. Receipt of user inputs for moving an avatar through the doorway may result in placing the avatar in a new environment that may be configured to represent the interior of each respective building. Environment 300 may include certain doors that lead to other environments that a participant does not desire to visit. For example, the interior of buildings 312 and 310 may not be of interest to the user.

Therefore, the user should be provided with a link or command, that when provided to the game engine, permits the user to change the transport characteristics of a portal or other transportation element. For example, double-clicking on a door or building may cause a customization menu 320 to appear. The customization menu should allow the user to select a custom destination from one or more alternative destinations. In the illustrated example, the customization menu displays a map of the immediate environment with alternative destinations 322 shown in a separate screen area. A user may "click and drag" a desired building in or out of the displayed environment to change the building located on road 302. In effect, this action changes both the external appearance of the doorway and the place to where it leads. In the alternative, or in addition, the destination of the portal may be changed without changing its external appearance in the common environments 300, 300'.

Using the system herein described, the user may change the destination of those doors such that when the user who has made the changes directs her avatar to move through those doors, that user arrives in a destination that the user has selected rather than the original destination set by the environment's designer. The instant technology contemplates that all other users who have not similarly changed the destination of that doorway may still arrive at the original destination as set by the environment's designer. The new destination may be a common environment, or a private environment accessible only to a particular user and that user's invitees (or other club members, etc.). In addition, the system may be configured so that changes as made by one or more users authorized by the user also affect the user's own destination settings.

Optionally, some doorways in the environment may be locked so that they cannot be changed, while other portals may be customized. For example, buildings 304 and 306 may represent buildings or environments belonging to commercial sponsors, which are locked to protect the value of these commercial properties. In addition, a user may be permitted to change the destination on both sides of the portal—to change not only where it leads, but where it leads back to. Some limitation on the ability to change portals to lead to private environments may be desirable, to prevent participants from getting lost or stuck in private environments with no convenient passage to the common environments of the system.

Another feature of the instant technology is that the user may be able to customize the look of the transportation mechanism. Thus, the user may wish to change the destination of a portal in a primary environment, and he may also wish to change the look of the portal as well as the façade surrounding the area of the portal such that it is more suitable for the new destination, as illustrated by FIGS. 3A and 3B. The instant technology permits the user to make those changes by any suitable procedure, such as creating the new graphics, or copying and pasting existing graphics, or instructing the environment to display any of the available graphics, or any other manner for effecting these changes as is well known in the art, such that the user who has made those changes experiences those changes via interaction of the user's avatar with the environment. For example, a user presented with an editing screen 320 may remove building 310 and replace building 300 with building 326 to create the modified environment 300'.

All other users who have not similarly requested or effected those changes may still perceive the environment as set by the environment's designer, e.g., default environment 300 in the illustrated example. However, users may have the ability to establish a mechanism whereby changes as made by one or more users authorized by the user may effect the user's own environmental and area perception settings. Thus, for example, a wife may make changes to the various portal and façade graphics, and the husband, if he has established that he would prefer to have all changes effected by his wife also affect him, will also realize those changes. User's may be identified as known in the art; for example, requiring user's to log in with a user name and password, and/or writing user identifying information to client machines that access the multi-user environment.

In some embodiments, a user may be provided with an ability to create a fully customized environment by selecting other environments or areas that the user wishes, copying and pasting them into a custom area or environment. By so obtaining existing facades, portals, environments and areas, and assembling them, the user will be able to establish an environment that is customized to the user's specific interests and needs. Such customized environments may be used only by the user, or, in the alternative, by other users who are permitted, invited or otherwise allowed to use the environment, or in the alternative, by everyone who desires to use the custom environment. Thus, for example, a user may take her favorite environment and replace several stores and meeting halls that she does not use with other stores and meeting halls that she frequents, and thereby create an essentially fully customized environment with all of her favorite environments and areas, all within easy navigation of her primary environmental destination.

Customization or environments may be configured to permit other users to be within the same original environment, and thus be visible and capable of interacting with the user(s) of the custom environment, even though for those other users, the various environments and areas may be different. For example, unrelated users may see each other on the street 302 that is outside of the various doors/portals, but if the two users walk through a door or portal that is not set to the same destination, the users will then arrive in different destinations and no longer be in the same environment or area. Referring to FIGS. 3A and 3B, a first user may be present on road 302 and walk into building 312 to arrive in a different destination than a second user who walks with through the same door into a different building 326.

The system may also enable users to create areas or environments that will serve as personal transportation centers. Under this feature, a user could create a personal environment that is totally customized, with no pre-existing base environment. The environment that the user creates can be assembled using any available techniques, but such that at least one portal is placed within the environment. The destination of that at least one portal may be established by the user. The geometry of the environment may also be established by the user so that the user has the ability to customize that transportation area so that it optimally suits their desire. A transportation center may be provided as a private environment linked to one or more common environments via a portal. At least one portal in the transportation center may be locked so that it always leads to a defined common environment. Other portals may be located closely adjacent to one another to provide convenient access to desired common and private destination environments.

The system may further be configured to permit the user to customize the destination of portals such that one portal may serve more than one destination depending on user defined parameters including but not limited to: time of day, day of week, time of year, preset sequential destinations, user commands upon entry to the portal, user commands prior to entry, how the user signed in to the VRU, random destination, results of a search, prior actions of the user, or the prior location or locations of the user in the VRU. Thus, a single portal may allow the user the ability to transport to more than one destination area or environment based on parameters and preferences as established by the user and/or the operator of the VRU.

An advantage of the instant technology is that it provides users with a way to organize their portals and thus simplify their ability to navigate in a VRU. This is highly advantageous over existing transportation methods used by existing VRU's. Thus, a user may, for example, have a portal for all their work related destinations and a different portal for all of their shopping destinations. As the user is entering the portal, if they wish to go to a work destination, the user could use a method as is well known in the art, such as selecting from a drop-down menu, to find an appropriate destination when entering the first portal, or from a similar organized drop-down menu to find a shop for her shopping needs, from her second portal. The advantages compound as users create additional custom portals with greater granularity of defined destinations.

In some embodiments, a user's customized portals in her main transportation center lead to other customized environments which contain customized portals that are of greater specificity, which portals may lead to an unlimited number of additional environments with portals of greater and greater specificity until the user uses a final portal to arrive at a new environment. For example, a user may pass through a "shopping" portal to arrive at an environment that includes her favorite shopping destinations. She may then pass through a "clothing" portal, then through a portal leading to a specific dress shop to find an item she is looking for.

In yet another embodiment of the technology, portals in the customized transportation center and any more specific custom transportation centers that the user uses, may contain facades of the destination, an actual view of the outside and/or interior of the destination (through use of virtual video cameras as is well known in the art, or through other similar mechanisms) and other graphical or textual or other information, which may provide the user with information such as but not limited to whether the destination has been modified since they last visited, or whether other users are inside or are entering and exiting the environment.

Figures 4A, 4B:
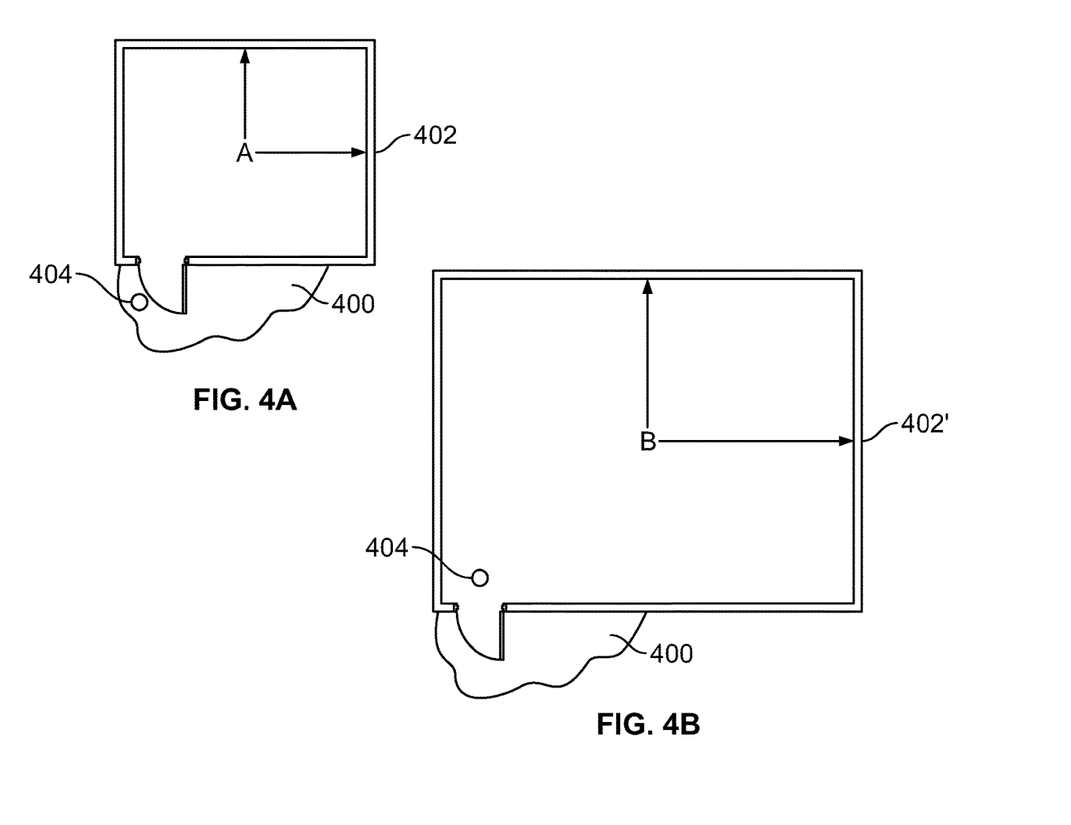
FIGS. 4A-4B are schematic plan views showing exemplary operation of an expanded environment space within a VRU.

The space available to a destination need not be limited to its apparent size. Referring to FIGS. 4A and 4B, a building 402 may have an apparent area footprint "A" when viewed from the outside environment 400 by a user 404. After the user 404 enters the building 402', it may be assigned second apparent area footprint "B" that is not equal to "A." Ordinarily, "B" should be larger than "A," although it can also be smaller. This feature is not limited to enclosed structures or environments. It may apply to any bounded area or volume of the VRU. For example, a parcel of virtual real estate may be increased in size after a user enters it. This permits neighbors to dwell in close proximity, which is more convenient for visiting, while still permitting large areas within each plot. This feature is also useful for relieving overcrowding that may occur as a VRU increases in popularity.

To enable this expanded space feature, the VRU system may maintain separate maps of non-expanded and expanded spaces. Some portion or all of the boundary around the expanded space is configured to act as a portal (or as numerous separate portals) from the non-expanded space into the expanded space. For example, as shown in FIG. 4A, a door in the wall of the building 402 acts as a portal to an expanded interior space. For non-enclosed spaces, a line or surface surrounding the expanded space in the non-expanded space may be mapped to a line or surface surrounding the non-expanded space inside the expanded space via a non-unitary mathematical transform (i.e., not merely multiplication by one), or using a look-up table. For example, if an expanded area is provided with a hundred-fold ($10^2$) expansion of space, every meter of boundary around the expanded space in the non-expanded space may be linearly mapped to a corresponding boundary around the expanded space in the expanded space by a factor of ten. Thus, an avatar entering the expanded space from the 4.5 meter boundary position in the non-expanded space may be placed at the 45 meter boundary position in the expanded space. If the avatar later returned to the non-expanded space at the 87 meter boundary position in the boundary of the expanded space, the avatar may be placed at the 8.7 meter boundary position in the non-expanded space.

After a user passes through a portal, the VRU system uses the map of the expanded space to generate the user environment, with the user placed in the expanded space at an entry point defined for the passed portal. Likewise, some portion or all of the boundary of the expanded space is configured as a return portal or portals to the originating non-expanded space. Optionally, a portion of the boundary may be configured as a portal to other spaces, or the expanded space, like the non-expanded space, may simply contain portals to other places. After a user has passed through a return portal, the VRU system uses the map of the non-expanded space to generate the user environment, with the user placed in the non-expanded space at a re-entry point defined for the passed portal. In this way, seamless transitions may be made between expanded and non-expanded areas. The effect of such transitions may therefore be as if objects passing into the expanded space shrink in size, and shrunken objects passing back into the non-expanded space are restored to their normal size.

Figure 5A:
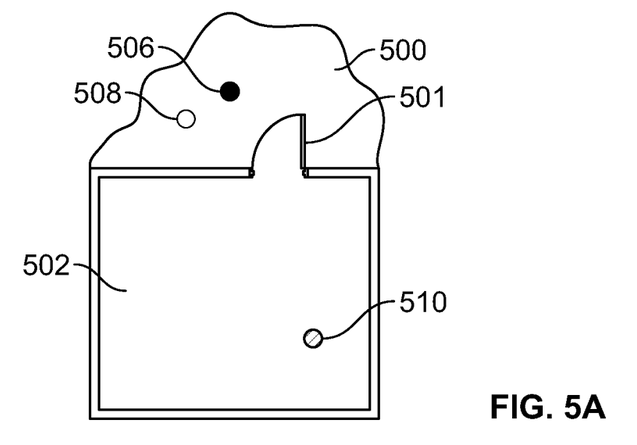
FIGS. 5A-5C are schematic plan views showing exemplary operation of a customized doorway for different participants.
Figure 5B:
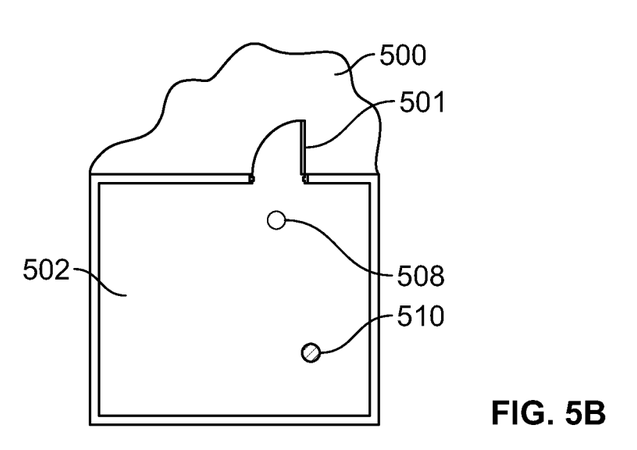
Figure 5C:
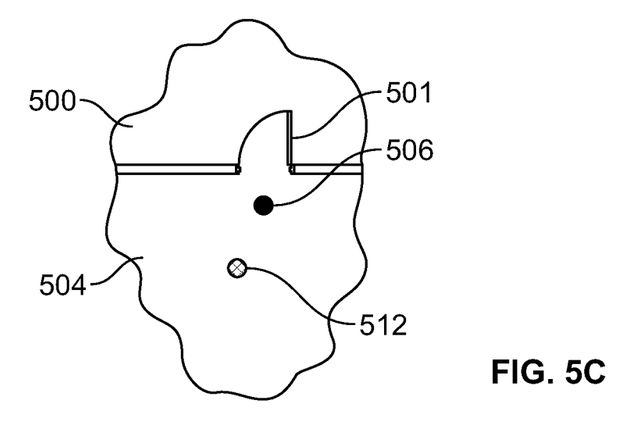

FIGS. 5A-5C illustrate operation of a customized portal for different users. Initially, avatars 506, 508 belonging to different participants are located in a common area 500, shown in plan view. Each avatar is therefore rendered to both participants; i.e., each participant can see and control his own avatar, and can see and interact with the avatar controlled by the other participant. The two avatars 506, 508 are next to a doorway 501 that has been customized for avatar 506 to lead to a custom environment 504. The default destination for the doorway is environment 502, in which another avatar 510 happens to be present.

FIGS. 5B and 5C show what happens after the avatars 506, 508 pass through the doorway 510. As shown in FIG. 5B, avatar 508 is in environment 502 with avatar 510. Avatar 506, however, is absent as far as avatar 508 is concerned. As shown in FIG. 5C, avatar 506 is in environment 504 with another avatar 512 that happens to be present there. Avatar 508 is not in environment 504. Operation of doorway 501 may be configured such that if both avatars 506, 508 (and either of avatars 510, 512) pass back through the door, these avatars will be present together again in the common environment 500.

Figure 6:
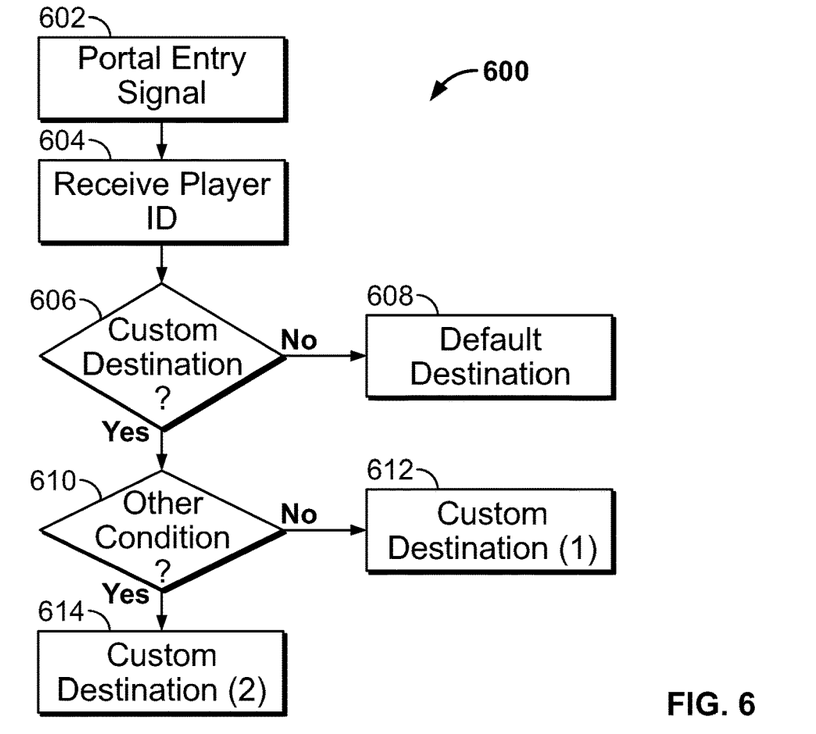
FIG. 6 shows exemplary steps of a method 600 for operating a VRU portal.

FIG. 6 shows exemplary steps of a method 600 for operating a VRU portal. The method may be performed by a VRU engine in a system such as described above. The system includes customization data for various portals in the VRU and instructions for operating in response to such data. At step 602, the VRU engine may receive or generate a signal indicating that a player has entered a portal, or is about to enter a portal. For example, the VRU engine may generate a signal indicating that an avatar moving in the VRU space in response to input from a client device has triggered an entry transaction with a portal object of the VRU space. Generally, such a signal will be generated when some portion of an avatar's surface has broken a portal plane, the avatar coordinates pass through a defined plane or space, the user causes the avatar to perform some action, such as pushing a virtual button or moving to a defined place, or by any other suitable change in state of the avatar.

At step 604, the VRU engine receives an identifier for the avatar. This may be supplied, for example, by a data record maintained for the avatar at the server level, client level, or some combination of the foregoing. In the alternative, the user may be required to provide an identifier and/or password. The identifier should be unique to the avatar performing the action. Note that a single participant may register more than one avatar, and may desire to customize portals differently for different avatars. Such capability may be facilitated by providing identifiers for avatars, not merely for users. Generally, unique identifiers may be assigned to any or every object in the VRU space. This includes, of course, the portal through which the avatar is passing, which may have its own unique identifier.

At step 606, the VRU engine may determine whether a custom destination has been defined for the portal and avatar in question. For example, the VRU may maintain an index of custom destinations, organized by avatar and portal ID. If a record exists in the index, the custom destination may quickly be determined from it. If no record exists, then it is determined that no custom destination has been defined.

If no custom destination is defined, the avatar is caused to enter a default destination for the portal, at step 608. Conversely, if a custom destination environment is defined for the avatar and portal, the avatar is caused to enter the custom destination environment at step 612. At the VRU engine level, such entry to a default or custom destination environment may be facilitated by identifying the respective environment, pulling the environmental data for the destination environment, and ether rendering the scene and providing the scene to the player interface at the client level, or sending the environmental data to the client for rendering at the client level. It should be appreciated that data for certain elements, such as core elements, may be stored locally at the client level to reduce bandwidth demands. The server-located engine in such case may merely provide the client with data concerning non-core elements and elements controlled by other clients, which may then be added to the core elements at the client level to render the scene.

At optional step 610, the VRU engine may determine whether the destination is subject to other conditions, for example a code specified by the user, a time preference, a frequency-of-use preference, or other condition. The other condition may be specified by the user operating the avatar when configuring the portal. In the alternative, the other condition may be specified by another user, or a system administrator, according to examples provided hereinabove. If no other conditions apply, the avatar is delivered to a first custom destination, at step 612. Optionally, if another condition applies, then the avatar is delivered to a second custom destination, at step 614.

Figure 7:
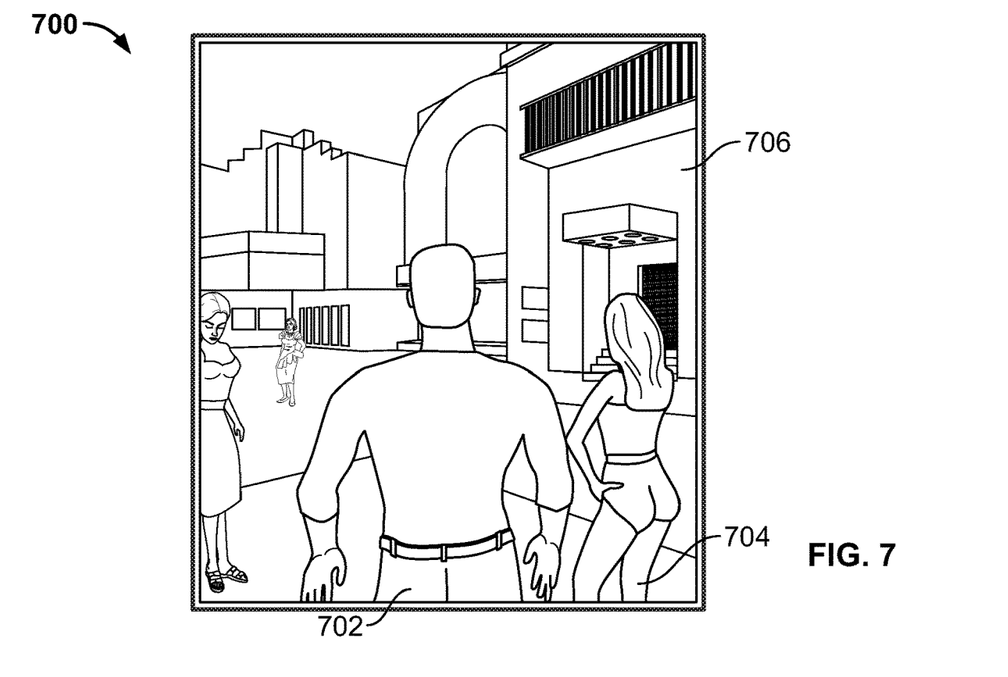
FIG. 7 is an exemplary view of a VRU with avatars.

FIG. 7 shows an exemplary common scene 700 containing multiple avatars, e.g., avatars 702, 704. Each avatar is controlled by a different player via a remote interface. The common scene 700 appears to be the same for each avatar. However, each player may select a different viewpoint of the scene, so the rendered view of the scene may be different for different players. Scene 700 includes multiple storefronts, such as storefront 706, that may serve as portals to common spaces, personalizable spaces, or some combination of the foregoing.

Having thus described a preferred embodiment of simulation method with user-defined transportation and space, it should be apparent to those skilled in the art that certain advantages of the within system have been achieved. It should also be appreciated that various modifications, adaptations, and alternative embodiments thereof may be made within the scope and spirit of the present disclosure. For example, implementation of the method over a wide area network has been illustrated, but it should be apparent that the inventive concepts described above would be equally applicable to other networks.

What is claimed is:

1. A system comprising:
a host computer operating a modeling engine for a multi-user shared modeled three-dimensional environment including manipulation of avatars and modeled objects in response to input from a plurality of clients, the modeling engine operative for:
modeling a three-dimensional environment containing a space having an apparent area "A" when viewed from outside the space;
modeling the three-dimensional environment containing the space having an apparent area "B" when viewed from inside of the space; and
wherein the apparent areas "A" and "B" are not equal;
wherein the apparent areas "A" and "B" are related by a non-unitary mathematical transform; and
wherein a difference in size or shape between "A" and "B" is such that the space "B" could not exist in the physical world within the space "A".

2. The system of claim 1, wherein the host computer maintains separate maps of the space having the apparent area "A" and of the space having the apparent area "B".

3. The system of claim 1, wherein some portion of a boundary around the space acts as a portal from the space having one of the apparent areas "A" or "B" to the space having the other of the apparent areas "A" or "B".

4. The system of claim 3, wherein the user passes from the space having the apparent area "A" to the space having the apparent area "B", and the system uses a map of the space having the apparent area "B" to generate the user environment.

5. The system of claim 3, wherein the user passes from the space having the apparent area "B" to the space having the apparent area "A", and the system uses a map of the space having the apparent area "A" to generate the user environment.

6. The system of claim 1, wherein a line or surface surrounding the exterior of the space is mapped to a line or surface surrounding the interior of the space, and such mapping is accomplished utilizing a non-unitary mathematical transform.

7. The system of claim 1, wherein a line or surface surrounding the exterior of the space is mapped to a line or surface surrounding the interior of the space, and such mapping is accomplished utilizing a look-up table.

8. The system of claim 1, wherein a user can see through an open door in the space and the apparent area "B" inside the door is greater than is physically possible based on the apparent area "A" outside the door.

9. A system comprising:
a host computer operating a modeling engine for a multi-user shared modeled three-dimensional environment including manipulation of avatars and modeled objects in response to input from a plurality of clients, the modeling engine operative for:
modeling an environment containing a three-dimensional element having a first footprint corresponding to an apparent area "A" when viewed from outside the three-dimensional element;
modeling the environment containing the three-dimensional element having a second footprint corresponding to an apparent area "B" when viewed from inside the three-dimensional element; and
wherein the apparent areas "A" and "B" are not equal
wherein the apparent areas "A" and "B" are related by a non-unitary mathematical transform; and
wherein the difference between the first footprint and the second footprint is such that the area could not exist in the physical world.

10. The system of claim 9, wherein the system maintains separate maps of the element having the first footprint and of the element having the second footprint.

11. The system of claim 9, wherein a portion of a boundary around the element acts as a portal from the element having the first footprint to the element having the second footprint.

12. The system of claim 9, wherein a user can see through an open door and the second footprint inside the door is greater than is physically possible based on the first footprint outside the door.

13. The system of claim 9, wherein the element is a parcel of virtual real estate and neighbors in the parcel are in close proximity when viewed from outside the parcel, and are not in close proximity when viewed from inside the parcel.

14. A system comprising:
a host computer operating a modeling engine for a multi-user shared modeled three-dimensional environment including manipulation of avatars and modeled objects in response to input from a plurality of clients, the modeling engine operative for:
modeling an environment containing an element occupying a non-expanded space having an apparent area "A" when viewed from outside the element;
modeling the environment containing the element occupying an expanded space having an apparent area "B" when viewed from inside the element; and
wherein the apparent areas "A" and "B" are not equal;
wherein the apparent areas "A" and "B" are related by a non-unitary mathematical transform; and
wherein the area of the non-expanded space is smaller than the area of the expanded space such that the element could not exist in the physical world.

15. The system of claim 14, wherein the host computer maintains separate maps of the non-expanded space and the expanded space.

16. The system of claim 14, wherein a portion of a boundary around the expanded space acts as a portal from the non-expanded space to the expanded space.

17. The system of claim 14, wherein the element is visible through an open door and the area of the expanded space visible through the open door is greater than is physically possible based on the area of the non-expanded space.

18. The system of claim 14, wherein objects passing into the expanded space from the non-expanded space shrink in size.

19. The system of claim 18, wherein objects that are shrunken in size and passing back into the non-expanded space are restored to a non-shrunken size.

20. The system of claim 14, wherein objects passing into the expanded space from the non-expanded space grow in size.

* * * * *